Patented Aug. 14, 1928.

1,680,898

UNITED STATES PATENT OFFICE.

JEAN MATTI, OF PULLY, SWITZERLAND.

PROCESS FOR MAKING BAKED-FOOD PRODUCTS.

No Drawing. Application filed September 5, 1925, Serial No. 54,812, and in Switzerland March 30, 1925.

This invention relates to a process for making bread, pastries and other food products having bread as a base, in such a manner that they may be preserved in a fresh and palatable condition for a considerable length of time.

In preparing dough for making bread and the like, it is necessary for the dough to stand for a few hours in order to allow the yeast to work, and to give to the dough the desired consistency. After the dough has been left in the molds during this period, it is usually taken out before being put into the oven for baking.

Bread made in this manner has certain disadvantages, the most important of which is that it will not keep for more than a few days without spoiling. The crust does not afford sufficient protection from germs. When the bread is placed in a dry and well-aired room, it will quickly become dry and hard; when put in a damp place it will become moist and sour. In the case of pastries and other products having bread for a base, these disadvantages are more pronounced.

In order to obviate these objections and disadvantages, the present invention has for its object to provide a process by which these baked products may be maintained in a fresh and palatable condition for a considerable length of time. Bread made and treated according to this process can be preserved indefinitely, or, at least, for several years, keeping all the characteristics of fresh bread, while its nutritive value is increased.

The steps of the process may be explained by the following example: Take 100 kilograms of flour, mixed with 85 liters of water containing 4-5 per cent common salt, and add about ½ percent of artificial yeast, for instance, of beer or wheat, the latter being substituted for the leaven usually used, which is obtained by the fermentation of old dough. In order to prevent too great waste by evaporation during the baking of the bread, and to increase its nutritive value, there is added also a mixture of one and one-half to three percent of vegetable oil or animal fat mixed with glycerine, or refined paraffine oil, of such a nature that its use is not forbidden by law. This fatty or oily ingredient is added in order that the bread may retain its moisture, and to supply the necessary amount of fat for retaining the gluten and albumen contents of the bread.

The mixture thus formed is then kneaded, either by hand or by machinery, for twelve to fifteen minutes at a temperature of about 38° C., this temperature being obtained by heating the water before it is mixed with the flour. The dough is then left for ten to fifteen minutes in order that the gluten and the albumen may be dissolved, after which it is again kneaded for about three minutes, in order to give to the dough more consistency and elasticity after the gluten has become dissolved and fermentation has begun, which converts the glucose into alcohol.

Thus prepared, the dough is put in suitable tins or molds, and baked in the oven. When the bread is to be preserved for a very long time, it is left in these molds after being baked. When this is to be done, suitable covers are placed on the molds and hermetically sealed before they are put in the oven. A small hole is provided in each cover, which is plugged up and sealed as soon as the bread is taken from the oven. In this state, the bread will remain fresh for years, and is removed from the package only when it is to be eaten.

For preserving the bread for a shorter period of time, it may be taken out of the mold and coated with a mixture of albumen, such as is obtained from the white of eggs, or with refined paraffine oil, and powdered with flour. When treated in this manner, the bread will remain fresh for three months or more.

The several steps of the process above described are simpler, and require less time than the methods which have been heretofore employed. When the bread remains in the original mold in which it is baked, the operation of taking it out of the mold is dispensed with. The entire space within the oven is utilized, which it is impossible to do when baking round loaves, or fancy bread. The capacity of the bakery is, therefore, increased.

The fact that the bread is baked in its own package and preserved therein by being hermetically sealed as soon as it comes out of the oven protects the bread against injury or unsanitary conditions due to handling, as well as from the attacks of parasites or rodents.

Since the bread prepared in this manner is absolutely protected against germs and ferments resulting from moisture, cryptogamic growths and the like, the period of preservation is practically unlimited.

In order to further increase the nutritive value of bread made according to this process, there may be added to the dough thus prepared, just before kneading, a mixture containing 20 liters of skim-milk, 100 grams of artificial yeast, and 100 grams of leaven obtained by the fermentation of old dough, the whole being heated to 30° C., and left for thirty-six hours before baking, in order to allow its complete fermentation.

The above process may be used not only for ordinary bread, but also for fancy bread, and for sandwiches, pastries and the like. For making sandwiches, the dough is prepared in the same manner, and meat, in the raw state, is rolled therein. Lean smoked ham is preferably used, and suitable condiments are added to the meat, which is allowed to stand for about twelve hours in order that the condiments may penetrate into the meat and prevent its decomposition. The meat is rolled into the dough, and the latter is then baked in the oven in the same manner as bread alone.

What is claimed is:

The process of making bread and the like, which comprises placing the dough in a mold, covering the mold, placing the dough in an oven and baking the same, the cover being provided with an opening for permitting the escape of vapors, said opening being plugged as soon as the baking has been completed so as to obtain a hermetically sealed package.

In testimony, that I claim the foregoing as my own, I have hereto affixed my signature.

JEAN MATTI.